US009552301B2

(12) United States Patent
Wang et al.

(10) Patent No.: US 9,552,301 B2
(45) Date of Patent: Jan. 24, 2017

(54) METHOD AND APPARATUS RELATED TO CACHE MEMORY

(71) Applicant: Advanced Micro Devices, Inc., Sunnyvale, CA (US)

(72) Inventors: Zhe Wang, San Antonio, TX (US); Junli Gu, Beijing (CN); Yi Xu, Beijing (CN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 162 days.

(21) Appl. No.: 13/942,291

(22) Filed: Jul. 15, 2013

(65) Prior Publication Data
US 2015/0019823 A1    Jan. 15, 2015

(51) Int. Cl.
*G06F 12/12*    (2016.01)
*G06F 12/08*    (2016.01)

(52) U.S. Cl.
CPC ....... *G06F 12/0891* (2013.01); *G06F 12/0804* (2013.01); *G06F 12/0808* (2013.01); *G06F 12/0864* (2013.01); *G06F 12/12* (2013.01); *G06F 12/126* (2013.01)

(58) Field of Classification Search
None
See application file for complete search history.

(56) References Cited

U.S. PATENT DOCUMENTS

| | | | | |
|---|---|---|---|---|
| 5,765,193 A * | 6/1998 | Rosich et al. | | 711/136 |
| 8,793,355 B2 * | 7/2014 | Moser | | H04L 61/1523 709/214 |
| 2008/0320222 A1* | 12/2008 | Dhodapkar | | 711/118 |
| 2011/0113198 A1* | 5/2011 | Cheng et al. | | 711/128 |
| 2012/0317367 A1* | 12/2012 | Grayson et al. | | 711/143 |
| 2013/0262772 A1* | 10/2013 | Rabinovitch et al. | | 711/128 |
| 2014/0140153 A1* | 5/2014 | Son et al. | | 365/200 |
| 2014/0298058 A1* | 10/2014 | Klingauf et al. | | 713/322 |

OTHER PUBLICATIONS

Vivek Seshadri, Onur Mutlu, Michael A. Kozuch and Todd C. Mowry, "The Evicted-Address Filter: A Unified Mechanism to Address Both Cache Pollution and Thrashing," 12 pages, PACT' 12, Sep. 19-23, 2012, Minneapolis, MN, ACM 978-1-4503-1182—Mar. 12, 2009.
Jeffrey Stuecheli, Dimitris Kaseridis, David Daly, Hillery C. Hunter and Lizy K. John, "The Virtual Write Queue: Coordinating DRAM and Last-Level Cache Policies," 11 pages, ISCA' 10, Jun. 19-23, 2010, Saint-Malo, France, ACM 978-1-4503-0053—Jul. 10, 2006.
Jason Zebchuk, Vijayalakshmi Srinivasan, Moinuddin K. Qureshi and Andreas Moshovos, "A Tagless Coherence Directory," 12 pages, MICRO' 09, Dec. 12-16, 2009, New York, NY, ACM 978-1-60558-798—Jan. 9, 2012.

* cited by examiner

*Primary Examiner* — Midys Rojas
*Assistant Examiner* — Stephanie Wu
(74) *Attorney, Agent, or Firm* — Polansky & Associates, P.L.L.C.; Paul J. Polansky

(57) ABSTRACT

A cache includes a cache array and a cache controller. The cache array has a plurality of entries. The cache controller is coupled to the cache array. The cache controller evicts entries from the cache array according to a cache replacement policy. The cache controller evicts a first cache line from the cache array by generating a writeback request for modified data from the first cache line, and subsequently generates a writeback request for modified data from a second cache line if the second cache line is about to satisfy the cache replacement policy and stores data from a common locality as the first cache line.

17 Claims, 4 Drawing Sheets

METHOD AND APPARATUS RELATED TO CACHE MEMORY

FIELD

This disclosure relates generally to data processors, and more specifically to caches for data processors.

BACKGROUND

Consumers continue to desire computer systems with higher performance and lower cost. To address higher performance requirements, computer chip designers have developed data processors having multiple processor cores along with a cache memory hierarchy on a single microprocessor chip. The caches in the cache hierarchy increase overall performance by reducing the average time required to access frequently used instructions and data. First level caches (L1) in the cache hierarchy are generally placed operationally close to a corresponding processor core. Typically, a processor core accesses its own dedicated L1 cache, while a last level cache (LLC) may be shared between more than one processor core and operates as the last cache between the processor cores and off-chip memory. The off-chip memory generally includes commercially available dynamic random access memory (DRAM) chips such as double data rate (DDR) synchronous DRAMs (SDRAMs).

The cache controllers store new entries in their corresponding cache arrays in response to accesses by the processor cores. If a processor core has modified data stored in a cache line, the cache controller determines when to write the "dirty" cache line back to the off-chip memory according to its writeback policy. For example, the cache controller may follow a writeback on eviction policy. However, delaying write back operations until the cache line is ready for eviction could degrade the overall performance of the microprocessor by causing the memory controller to inefficiently perform the writebacks and possibly stalling the processor core.

Figure 1:
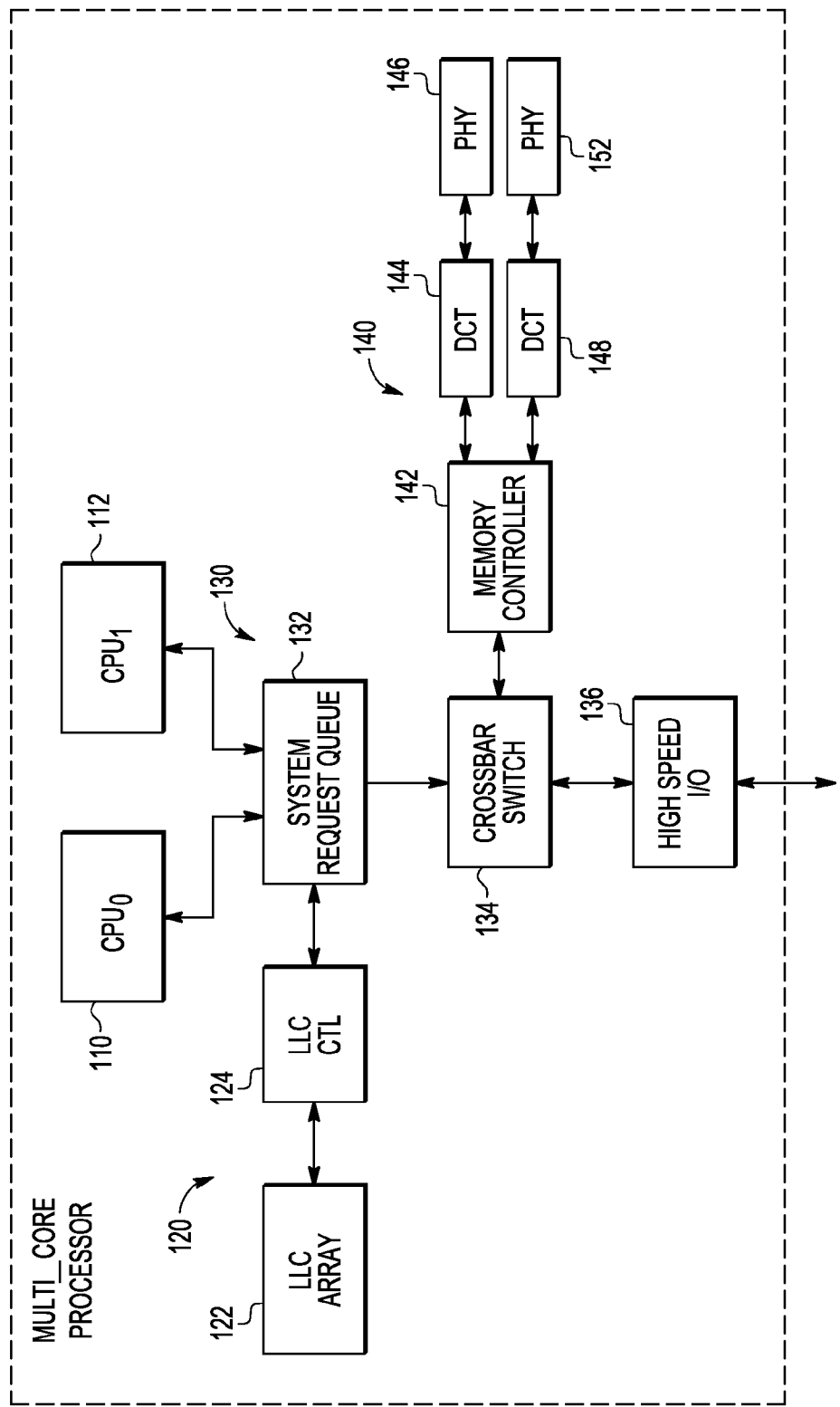
FIG. 1 illustrates in block diagram form a multi-core data processor with an LLC according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

A cache, for example an LLC, generally includes a cache array and a cache controller. The cache array has a multiple number of entries. Each entry stores a tag, a multiple number of state bits corresponding to the tag. Included in the multiple number of state bits are a modified bit and a multiple number of least recently used (LRU) bits. The cache controller is coupled to the cache array. The cache controller stores new entries in the cache array in response to accesses by a data processor. The cache controller also evicts entries according to a cache replacement policy. A cache as described herein evicts a first cache line from the cache array and subsequently writes back modified data from a second cache line if the second cache line (i) is likely about to satisfy the cache's eviction policy (e.g., has achieved a certain age, has been used less frequently than some frequency threshold, etc.), and (ii) stores data from a common locality as the first cache line, e.g. it has a memory row in common with the memory row of the first cache line. Thus on eviction of a cache line, the cache controller looks for about-to-be evicted (e.g., old), modified cache lines to the same row in memory and sends these cache lines to the memory controller at the same time. The cache controller works ahead to search the cache array to find the about-to-be-evicted, modified cache lines before they need to be evicted from the cache array. Thus, the cache controller combines write requests to the memory controller that enable the memory controller to efficiently schedule write requests to the same memory row.

In some embodiments, the cache controller includes a harvesting engine for selecting an entry from the cache array that has been modified and has achieved a certain age for write back. The harvesting engine uses multiple Bloom filters to quickly determine the location of candidate cache lines that might be to the same row as the evicted cache line. In some embodiments, a Bloom filter indicates the location in the cache of modified entries that have achieved a certain age and that share a particular partial row number (PRN). The harvesting engine searches a Bloom filter with the same PRN as a cache line being evicted to find candidate entries for writeback. The harvesting engine then searches the full row number of each cache line of this smaller subset of cache lines. If the full row number of the candidate cache line matches the row number of the evicted cache line, then the harvesting engine sends the candidate cache line along with the cache line being evicted to the memory system.

FIG. 1 illustrates in block diagram form a multi-core data processor 100 with an LLC 120 according to some embodiments. For the example shown in FIG. 1, data processor 100 generally includes a central processing unit (CPU) core 110 labeled "$CPU_0$" and a CPU core 112 labeled "$CPU_1$", an LLC 120, a traffic hub 130, a high speed input/output (I/O) 136, and a memory interface 140.

LLC 120 includes a cache array 122, and a last level cache controller (CTL) 124. Cache controller 124 is connected to cache array 122. In FIG. 1, LLC 120 is a shared second level cache (L2). In some embodiments, LLC 120 could be at a different level of the cache hierarchy. In some embodiments, LLC 120 may not be at the last level cache.

Traffic hub 130 includes a system request queue 132 and a crossbar switch 134. System request queue 132 is connected to each of CPU cores 110 and 112, is connected to cache controller 124, and has an output. Crossbar switch 134 has an input connected to the output of system request queue 132. High speed I/O 136 is connected to crossbar switch 134, and is connected to a set of high speed peripherals (not shown).

Memory interface 140 provides two DRAM channels, and includes a memory controller 142, a DRAM controller (DCT) 144, a physical layer interface (PHY) 146, a DCT 148, and a PHY 152. Memory controller 142 is connected to crossbar switch 134. DCT 144 is connected to memory controller 142 for a first memory channel. PHY 146 is connected to DCT 144 for the first memory channel. DCT 148 is connected to memory controller 142 for a second memory channel. PHY 152 is connected to DCT 148 for the second memory channel.

Cache controller 124 identifies dirty data and also determines when to write back the dirty data to external memory. Cache controller 124 is responsible for storing recently accessed data and evicting data according to a cache replacement policy. However, in addition, cache controller 124 performs a new feature in which it works ahead and pre-emptively performs write back operations on data that is about to be evicted in accordance with the cache replacement policy (e.g., older data if the eviction policy is based on data age, infrequently used data if the policy is based on frequency of use, etc.), before the "about-to-be-evicted" data is evicted from cache array 122. That is, the pre-emptive write-back operations are performed on dirty data that has almost attained the status to satisfy the cache replacement or eviction policy employed by the cache, and also shares locality with other data actually chosen for eviction. Memory controller 142 is able to take advantage of this new feature to perform efficient write back operations, and following read request operations. By using this new feature, cache controller 124 improves the overall performance of data processor 100. In the exemplary embodiments described below, the cache replacement policy is based on the age of the data stored in cache and, accordingly, the about-to-be-evicted data is assessed based on its age. However, other cache replacement policies are known and are likely to be developed. These other cache replacement policies might be employed in alternative embodiments.

In operation, each of CPU cores 110 and 112 generate memory access requests and provide them to system request queue 132. CPU cores 110 and 112 each include an L1 cache (not shown), and access their corresponding L1 cache to determine whether the requested cache line has been allocated to the cache before accessing the next lower level of the cache hierarchy.

When CPU cores 110 and 112 perform a read or write access, the corresponding CPU core checks the L1 cache first to see whether the L1 cache has allocated a cache line corresponding to the access address. If the cache line is present in the L1 cache (i.e. the access "hits" in the L1 cache), the corresponding CPU core completes the access with the L1 cache. If the access misses in the L1 cache, the L1 cache checks the next lower level of the cache hierarchy. CPU cores 110 and 112 share LLC 120, which provides the memory for a last level of cache within the cache hierarchy. Cache controller 124 stores new entries in cache array 122 in response to accesses by CPU cores 110 and 112. If the address of the request does not match any cache entries, LLC 120 will indicate a cache miss. In the example shown in FIG. 1, cache 120 follows an inclusive policy and once full, cache controller 124 identifies an entry for eviction from LLC 120 using its cache replacement policy to make room for the new data.

LLC 120, traffic hub 130, and memory interface 140 typically form a controller known as a Northbridge (NB). System request queue 132 synchronizes and stores accesses for dispatch to memory interface 140 or high speed I/O 136. Traffic hub 130 routes transactions to LLC 120, for example, requests from CPU cores 110 and 112, or a request from a high speed bus agent (not shown) to data processor 100 via high speed I/O 136. MCT 142 is adapted to access memory locations in the address space of memory, in response to memory access requests, and in particular, memory controller 142 sends DRAM read and write requests to DCTs 144 and 148. PHYs 146 and 152 each provide an interface for DCTs 144 and 148, respectively, to corresponding DRAM memory locations (not shown), as indicated according to DRAM compatible standards.

Cache controller 124 efficiently performs write back operations to improve the performance of memory interface 140 and the utilization of the external memory bus. Cache controller 124 selects cache lines that are least recently used for eviction. When evicting a cache line with dirty data, cache controller 124 issues a write request to memory interface 140. In accordance with various embodiments described herein, cache controller 124 further checks whether other, near-LRU dirty cache lines have the same locality as the cache line being evicted. For example, cache controller 124 could check whether the other cache lines are to the same row in memory as the cache line being evicted. If the other cache lines have the same locality as the cache line being evicted, cache controller 124 selects these cache lines for write back before they become least recently used. Then cache controller 124 marks them as clean and if they are not further accessed before they become least recently used, then they can be evicted without a later writeback.

Figure 2:
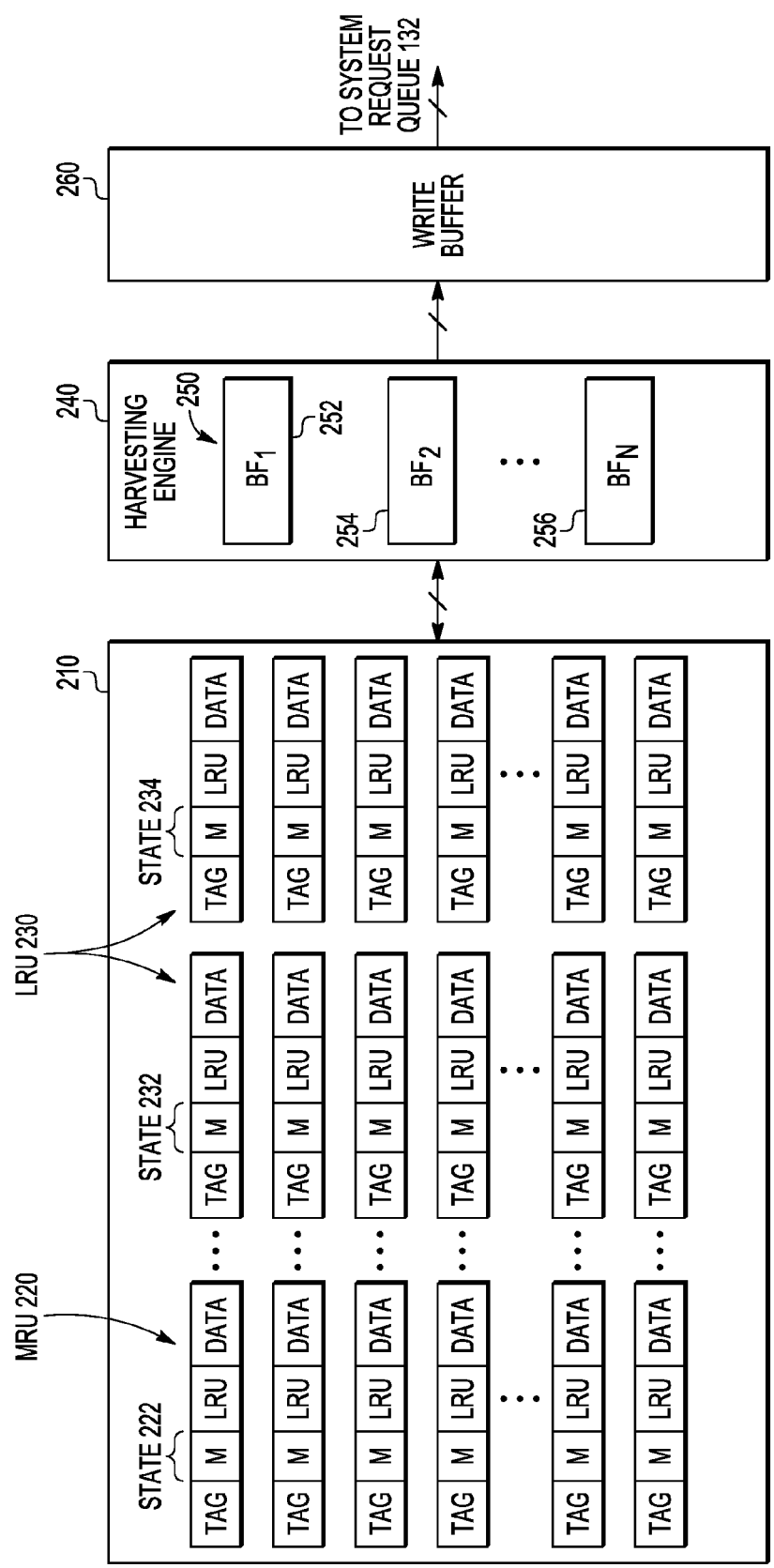
FIG. 2 illustrates in block diagram form a portion of an LLC that may be used to implement the LLC of FIG. 1, and a write buffer, according to some embodiments.

FIG. 2 illustrates in block diagram form a portion 200 of an LLC that may be used to implement LLC 120 of FIG. 1, and a write buffer 260, according to some embodiments. The example in FIG. 2 shows a logical association of cache array 210 and generally includes cache array 210, a harvesting engine 240, and write buffer 260.

Cache array 210 includes a set of cache array entries, having a representative set of most recently used (MRU) entries 220, and a representative set of LRU entries 230. Each of entries 220 stores a tag, a set of state bits 222 corresponding to the tag including a modified bit (M), a set of LRU bits, and a set of DATA bits. Each of entries 230 stores a tag, a set of state bits 222 and 234, respectively, corresponding to the tag including an M bit, a set of LRU bits, and a set of data bits.

Harvesting engine 240 includes a set of Bloom filters 250 including a Bloom filter 252 labeled "$BF_1$", a Bloom filter 254 labeled "$BF_2$", and a last Bloom filter 256 labeled "$BF_N$". Harvesting engine 240 is connected to cache array 210, and has an output.

Write buffer 260 has an input connected to the output of harvesting engine 240, and an output to provide and an output to provide write requests to system request queue 132.

For the example shown in FIG. 2, cache controller 124 uses harvesting engine 240, which includes Bloom filters 250, to efficiently determine which cache lines to write back to external memory, and to determine when to write back modified cache lines to memory. Write buffer 260 is connected between LLC 120 and memory interface 140, and stores cache lines that harvesting engine 240 selects for write back to an external memory. In some embodiments, memory interface 140 sends write requests to an external memory when write buffer 260 is full, or when a memory rank is idle and the number of write requests in write buffer 260 is larger than a certain threshold.

In operation, each cache line of cache array 210 includes the TAG field to associate an entry with a physical address. According to certain coherency protocols, each cache line includes state bits such as state bits 222, 232, and 234 to indicate a particular state the cache line is in. For example, for the "MOESI" cache coherency protocol, state bits 222, 232, and 234 indicate whether a cache line is modified (M), owned (O), exclusive (E), shared (S), or invalid (I).

Cache controller 124 accesses the LRU field to determine an LRU cache line, and actually evicts cache lines that are LRU when it must make room in cache array 210 for a new cache line. Cache controller 124 also checks near LRU entries 230 for early (i.e. pre-eviction) write back based on having a high locality write request, for example, a row buffer hit request based on a row address that is the same as the row address of a cache line that is being evicted. MRU entries 220 represent most recently used entry positions in cache array 210, and LRU entries 230 represent least recently used entry positions in cache array 210. LRU entries 230 that have their M bits set are candidates for eviction from cache array 210 and write back to external memory.

Harvesting engine 240 uses Bloom filters 250 for determining modified cache lines for write back based on a row address of entries. Bloom filters 250 each indicate a locality of cache lines. In some embodiments, cache controller 124 uses Bloom filters to search entries of cache array 210 to determine if a row of the entry matches a row of an evicted line. In some embodiments, for write back efficiency, harvesting engine 240 picks an entry for write back if its row address matches an address of a row of the cache line being evicted.

In some embodiments, each of Bloom filters 250 corresponds to a certain number, N, of sets of cache array 210 having the same partial row number (PRN). Each of Bloom filters 250 includes a certain number of bits, M. In some embodiments, harvesting engine 240 of cache controller 124 indexes the M bits using a certain number, K, of hash functions. Also, in some embodiments, the K functions include hash functions, and cache controller 124 determines a location of data to search cache array 210 data based on evaluating the K hash functions.

Figure 3:
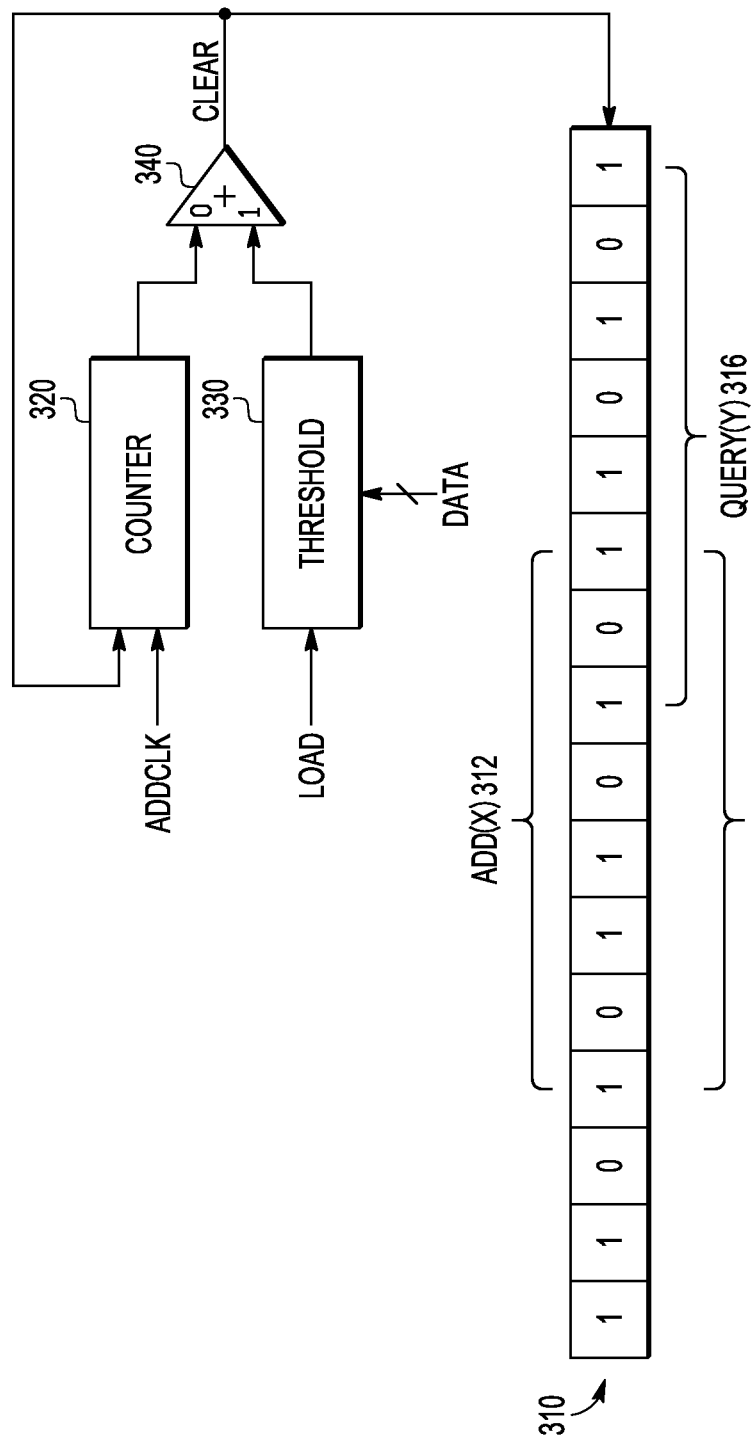
FIG. 3 illustrates a representation of a portion of a Bloom filter that may be used to implement the Bloom filters of FIG. 2 according to some embodiments.

FIG. 3 illustrates a representation of a portion 300 of a Bloom filter that may be used to implement the Bloom filters 250 of FIG. 2 according to some embodiments. For the example shown in FIG. 3, portion 300 includes a set of 16 bits 310, a counter 320, a register 330 labeled "THRESHOLD", and a comparator 340 labeled "+". The set of 16 bits 310 are indexed by a representative set of hash functions 312, 314, and 316 that each identify two bits, where each of the 16 bits 310 store a logic high or a logic low. Each of the set of 16 bits 310 have an input for receiving a signal labeled "CLEAR".

Counter 320 has a first input for receiving the CLEAR signal, a second input for receiving a clock signal labeled "ADDCLK", and an output. Register 330 has a first input for receiving a signal labeled "LOAD", a second input for receiving a set of signals labeled "DATA", and an output. Comparator 340 has a first input labeled "0" connected to the output of counter 320, a second input labeled "1" connected to the output of register 330, and an output connected to the first input of counter 320 and the input of the set of 16 bits 310 for providing the CLEAR signal.

Cache controller 124 identifies least recently used cache lines for eviction, and also uses Bloom filters 250 to identify other high locality write requests (e.g. a row buffer hit or a write request that activates a parallel memory bank). In some embodiments, data processor 100 services back to back write operations, such as row buffer hit write requests. Cache controller 124 identifies candidates for write back and works with memory interface 140 to provide the candidates to write buffer 260. Cache controller 124 further works with memory interface 140 to determine whether to write back the modified cache lines at the time of eviction, or prior to eviction.

For example, harvesting engine 240 uses a partial address, based on the full address of the evicted cache line, to narrow down other potential row buffer hit write requests. Hash function 312 identifies a cache line to add to a corresponding one of Bloom filters 250 if the cache line has become one of LRU entries 230, or when a cache line of LRU entries 230 becomes dirty. Cache controller 124 keeps the cache line identified by Bloom filters 250 in cache array 210 until the cache line is ready for eviction, and clears the corresponding M bit. At the time of eviction, the cache line is already marked clean, so cache controller 124 invalidates the entry without having to write back the cache line to the external memory.

In operation, for the example shown in FIG. 3, cache controller 124 adds an element to bits 310, by indexing the set of 16 bits 310 with hash function 312, and setting the corresponding two bits 310 to a logic high (1). A logic high represents a bit corresponding to a particular set of entries of cache array 210. As discussed above, an example of a set of entries includes a row buffer hit or a write request that activates a parallel memory bank. In some embodiments, harvesting engine 240 examines a partial row address of entries that are members of a set, where the partial row address includes a certain number, P, of bits of the row address of the dirty cache line of cache array 210. Cache controller 124 uses the partial row number of the dirty cache block to compute the values of hash functions 312, 314, and 316. Cache controller 124 selects entries from LRU entries 230, and uses Bloom filters 250, which each use a corresponding partial row address, to narrow down cache line entries 230 that indicate membership information having a certain locality attribute associated with a Bloom filter. For example, on eviction of a cache line with a certain partial row address, cache controller 124 provides the partial row address to harvesting engine 240. Harvesting engine 240 uses the hash function based on the partial row address to query the set of 16 bits 310 for all values that correspond to entries matching the partial row address of the evicted cache line.

Harvesting engine 240 queries an element of bits 310, and determines the element is not a member of a set if any of the indexed bits are a logic low state (0). For example, hash function 314 indicates that the corresponding element has a certain PRN since each of the two bits identified by hash function 314 are both a logic high state. Infrequently, a Bloom filter indicates a false positive condition. For example, the element identified by hash function 316 appears to be a member of a set, since the two bits are each a logic high state. However, hash function 316 is shown in FIG. 3 to illustrate a false positive condition. Overall, harvesting engine 240 largely selects proper members of a set, and cache controller 124 significantly improves write back memory performance using Bloom filters 250.

To be discussed further below, cache controller 124 is also capable of efficiently clearing entries (resetting to the logic low state) of each one of Bloom filters 250. Cache controller 124 moves a dirty cache block out of an LRU entries 230 position by evicting the entry from cache array 210, or by moving the entry to MRU entries 220. Within some Bloom filter organizations, a bit corresponding to the dirty cache block is only cleared if no other dirty cache line maps to that bit. However, for portion 300, counter 320 increments in response to the ADDCLK when cache controller 124 adds an element to bits 310. Cache controller 124 also loads DATA to register 330 representing a certain threshold value, T. Comparator 340 determines if a value of counter 320 is larger than T. If a value of counter 320 is larger than a threshold, T, comparator 340 provides the CLEAR signal to clear each of bits 310. Cache controller 124 next continues to add dirty cache blocks corresponding to the cleared Bloom filter.

By providing a harvesting engine that uses multiple Bloom filters and by efficiently adding elements, querying elements, and clearing elements from the Bloom filters, a cache controller efficiently determines least recently used cache lines and additional cache lines that are members of a high locality set to write back to memory. The cache controller also determines whether to write back the dirty cache lines, and the selected high locality cache lines prior to eviction, or during eviction.

Figure 4:
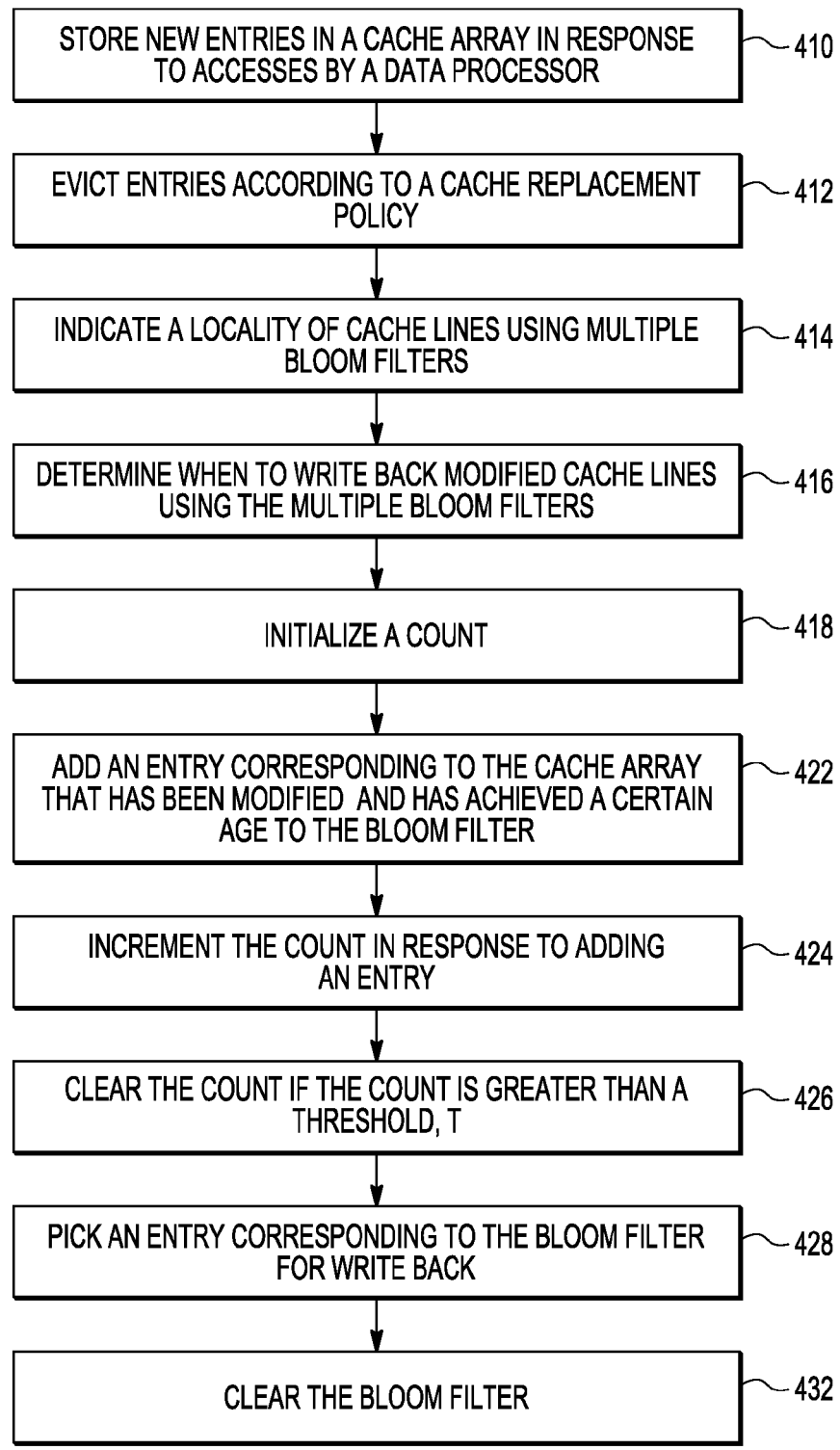
FIG. 4 illustrates a flow diagram of a method for performing a write back operation according to some embodiments.

FIG. 4 illustrates a flow diagram of a method 400 for performing a write back operation according to some embodiments. For the example shown in FIG. 4, action box 410 includes storing new entries in a cache array in response to accesses by a data processor. Action box 412 includes evicting entries according to a cache replacement policy. Action box 414 includes indicating a locality of cache lines using multiple Bloom filters. Action box 416 includes determining when to write back modified cache lines using the multiple Bloom filters.

In some embodiments, method 400 continues to action box 418 that includes initializing a count. Action box 422 includes adding an entry corresponding to the cache array that has been modified and has achieved a certain age to the Bloom filter. Action box 424 includes incrementing the count in response to adding an entry. Action box 426 includes clearing the count if the count is greater than a threshold, T. Action box 428 includes picking an entry corresponding to the Bloom filter for write back. Action box 432 includes clearing the Bloom filter. In some embodiments, the picking further includes performing back to back write operations.

Thus, a cache as described herein has a cache controller that works ahead and preemptively performs write back operations on older, modified data before the cache line is evicted from the cache. The memory controller is able to receive write requests with high locality memory references that it can then schedule efficiently. In particular, the cache controller not only selects data for write back that has been evicted from the cache array, but also other, near LRU modified cache lines that have a high locality with cache lines being evicted, such as modified cache lines that have achieved a certain age and also store data from a memory row in common with the memory row of the evicted cache line. Thus cache controller 124 selects other cache lines for write back before they are evicted from the cache array. By using this new feature, cache controller 124 improves the overall performance of data processor 100.

In various embodiments described above, the harvesting engine examined whether a modified entry in the cache that has achieved a particular age shared a common memory row of a cache line being evicted and written back. This measure of common locality is advantageous for current DDR memories because they require overhead to change rows being accessed. However in other embodiments for operation with other types of memory, a different measure of common locality besides a common memory row may also be used.

The functions of data processor 100 of FIG. 1, portion 200, harvesting engine 240, and the set of Bloom filters 250 of FIG. 2, and portion 300 of FIG. 3, may be implemented with various combinations of hardware and software. For example, some functions of portion 200, including harvesting engine 240, the set of Bloom filters 250, and portion 300, may be determined by an operating system, firmware, or software drivers, and stored as a table in non-volatile memory. For the example shown in FIG. 2, cache controller 124 uses harvesting engine 240 that uses Bloom filters 250 for indicating a locality of cache lines, and for determining whether a modified cache line is to a common memory row using the set of Bloom filters 250. In some embodiments, other hardware, software, or combined hardware and software implementations could be used. Some of the software components may be stored in a computer readable storage medium for execution by at least one processor. Moreover the method illustrated in FIG. 4 may also be governed by instructions that are stored in a computer readable storage medium and that are executed by at least one processor. Each of the operations shown in FIG. 4 may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Moreover, the circuits of FIG. 1, FIG. 2, and FIG. 3 may be described or represented by a computer accessible data structure in the form of a database or other data structure which can be read by a program and used, directly or indirectly, to fabricate integrated circuits with the circuits of FIG. 1, FIG. 2, and FIG. 3. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising integrated circuits with the circuits of FIG. 1, FIG. 2, and FIG. 3. The netlist may then be placed and routed to produce a data set describing geometric shapes to be applied to masks. The masks may then be used in various semiconductor fabrication steps to produce integrated circuits of, for example, FIG. 1, and FIG. 2. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, in the illustrated embodiment of FIG. 3, harvesting engine 240 is described as examining a partial row address of entries that are members of a set. In some embodiments, harvesting engine 240 could examine a partial row address of entries that are members of a set that corresponds to a channel, rank, and bank of the external memory, and the Bloom filters could each correspond to a channel, rank, and bank of the external memory. For the illustrated embodiment of FIG. 3, harvesting engine 240 is described as querying an element of bits 310. In some embodiments, harvesting engine 240 could query a certain number of Bloom filters each time, until a certain number of members of a set are found. In FIG. 2, cache array 210 of LLC 120 is logically described as operating with the MOESI cache coherency protocol, and as having entries 220 storing a tag, a set of state bits 222 corresponding to the tag including an M bit, a set of LRU bits, and a set of DATA bits. In some embodiments, LLC 120 could be physically implemented, for example, with a tags array and a separate data array. In some embodiments, state bits 222, 232, and 234 could be different bits, and LLC 120 could operate with a different cache coherency protocol.

Also, in the illustrated embodiments, data processor 100 includes two CPU cores 110 and 112. In some embodiments, data processor 100 could include a different number of CPU cores. CPU cores 110 and 112 could be other types of data processor cores than CPU cores, such as graphics processing unit (GPU) cores, digital signal processor (DSP) cores, video processing cores, multi-media cores, display engines, rendering engines, and the like. Any combination of data processor 100, portion 200, and portion 300, of FIG. 1, FIG. 2, and FIG. 3, respectively, for example, CPU cores 110 and 112, LLC 120, traffic hub 130, memory interface 140, cache array 210, harvesting engine 240, and the set of Bloom filters 250, could each use a common circuit design or different circuit designs. Also, any combination of data processor 100, portion 200, and portion 300, of FIG. 1, FIG. 2, and FIG. 3, respectively, could be formed on a single integrated circuit or could be formed on multiple integrated circuits.

Accordingly, it is intended by the appended claims to cover all modifications of the disclosed embodiments that fall within the scope of the disclosed embodiments.

What is claimed is:

1. A processor comprising:
a cache array having a plurality of entries; and
a cache controller coupled to said cache array, said cache controller for evicting entries from said cache array according to a cache replacement policy, wherein said cache controller evicts a first cache line from said cache array if said first cache line satisfies said cache replacement policy by generating a writeback request for modified data from said first cache line, and subsequently generates a writeback request for modified data from a second cache line if said second cache line is about to satisfy said cache replacement policy but does not yet satisfy said cache replacement policy and stores data from a common locality as said first cache line, wherein said common locality comprises one of a common memory row in a memory external to said cache array and a parallel memory bank in said memory,
wherein said cache controller comprises:
a plurality of Bloom filters each indicating a locality of cache lines, wherein said cache controller determines whether a modified cache line is to said common locality using said plurality of Bloom filters; and
a harvesting engine for selecting an entry from said cache array that has been modified and has achieved a predetermined age for writeback, said harvesting engine using said plurality of Bloom filters for further determining modified cache lines for writeback by examining a row address of entries that are members of a set indicated by a corresponding one of said plurality of Bloom filters, and picking an entry for writeback if its memory row address matches that of said first cache line.

2. The processor of claim 1 wherein said harvesting engine selects said corresponding one of said plurality of Bloom filters based on a partial row number of said first cache line, said partial row number comprising a predetermined number, P, of bits of said row address.

3. The processor of claim 1 wherein said plurality of Bloom filters comprises a Bloom filter corresponding to a predetermined number, N, of sets.

4. The processor of claim 3 wherein said plurality of Bloom filters further comprises a Bloom filter having a predetermined number of bits, M, said cache controller indexing said predetermined number of bits using a predetermined number of functions, K.

5. The processor of claim 4 wherein said predetermined number of functions comprises K hash functions, and said cache controller determines a location of data for searching in said cache array based on evaluating said K hash function.

6. The processor of claim 5, wherein said cache controller further searches said location to determine if a row of a cache line in said location matches a row of an evicted line.

7. The processor of claim 1 wherein said common locality comprises said common memory row.

8. The processor of claim 1 wherein said common locality comprises a request adapted to activate said parallel memory bank.

9. The processor of claim 1, wherein:
said second cache line is about to satisfy said cache replacement policy if it has achieved a predetermined age.

10. The processor of claim 9 wherein:
each of said plurality of entries of said cache array stores a tag, a plurality of state bits corresponding to said tag including a modified bit, and a plurality of least recently used (LRU) bits; and
said cache controller determines whether said second cache line has modified data in response to said modified bit, and determines whether said second cache line has achieved said predetermined age in response to said plurality of LRU bits.

11. A processor comprising:
a cache array having a plurality of entries, each entry storing a tag, a plurality of state bits corresponding to said tag including a modified bit, and a plurality of least recently used (LRU) bits; and
a cache controller coupled to said cache array, said cache controller for storing new entries in said cache array in response to accesses by a data processor, and evicting entries according to a cache replacement policy, said cache controller comprising:
a plurality of Bloom filters, each Bloom filter indicating membership information of cache lines that have a predetermined locality attribute, in a memory external to said cache array, associated with the Bloom filter; and
a harvesting engine for selecting an entry from said cache array that has been modified and has achieved a predetermined age for write back but does not yet satisfy said cache replacement policy, said harvesting engine using said plurality of Bloom filters for further determining modified cache lines for write back by examining a memory row address of entries that are members of a set, and picking an entry for write back if its memory row address matches that of an open page.

12. The processor of claim 11 wherein said plurality of Bloom filters comprises a Bloom filter corresponding to a predetermined number, N, of sets.

13. The processor of claim 12 wherein said harvesting engine examines a partial memory row address of said entries, said partial memory row address comprising a predetermined number, P, of bits of said row address.

14. The processor of claim 11 wherein said predetermined locality attribute comprises a high locality row buffer hit write request.

15. The processor of claim 11 wherein said predetermined locality attribute comprises a high locality write request for activating a parallel memory bank.

16. The processor of claim 11 wherein said predetermined locality attribute comprises an LRU write request.

17. A method of writing back modified cache lines comprising:
- evicting entries from a cache array according to a cache replacement policy;
- indicating a locality, in a memory external to said cache array, of cache lines using one or more Bloom filters, wherein said indicating said locality of cache lines comprises accessing a Bloom filter based on a partial memory row address of a first modified cache line selected for eviction;
- determining when to write back modified cache lines using the one or more Bloom filters, wherein said determining comprises determining that a second modified cache line shares one of a common memory row and a parallel memory bank with said first modified cache line and is about to satisfy said cache replacement policy but does not yet satisfy said cache replacement policy,
- initializing a count;
- adding an entry corresponding to said cache array that has been modified and has achieved a predetermined age to a corresponding one of said one or more Bloom filters;
- incrementing said count in response to said adding an entry;
- clearing said count if said count is greater than a predetermined threshold;
- picking an entry from said corresponding of said one or more Bloom filters for write back; and
- clearing said corresponding of said one or more Bloom filters.

* * * * *